United States Patent
Song et al.

(10) Patent No.: US 6,721,179 B2
(45) Date of Patent: Apr. 13, 2004

(54) STRUCTURE OF A HANDLE FOR AN EXTERNALLY-CONNECTED RE-WRITING DEVICE

(76) Inventors: Ming-Chi Song, P.O. Box 82-144, Taipei (TW); Chi-Hsiu Lee, P.O. Box 82-144, Taipei (TW)

( * ) Notice: Subject to any disclaimer, the term of this patent is extended or adjusted under 35 U.S.C. 154(b) by 2 days.

(21) Appl. No.: 10/193,919

(22) Filed: Jul. 15, 2002

(65) Prior Publication Data

US 2004/0008486 A1 Jan. 15, 2004

(51) Int. Cl.[7] ................................................ H05K 7/20
(52) U.S. Cl. ..................... 361/690; 361/679; 361/726; 361/727; 361/759; 361/798; 454/184
(58) Field of Search ................................ 361/600, 679, 361/685–697, 724–727, 731–732, 754, 759, 796–798; 454/184

(56) References Cited

U.S. PATENT DOCUMENTS

| | | | | |
|---|---|---|---|---|
| 5,717,570 A | * | 2/1998 | Kikinis ........................ | 361/685 |
| 6,111,755 A | * | 8/2000 | Park ............................ | 361/727 |
| 6,122,173 A | * | 9/2000 | Felcman et al. ............ | 361/726 |
| 6,490,153 B1 | * | 12/2002 | Casebolt et al. ............ | 361/685 |
| 6,560,098 B1 | * | 5/2003 | Beinor, Jr. et al. ......... | 361/725 |

OTHER PUBLICATIONS

US 2003/0090869 Liu et al"Fixing Apparatus For Data Storage Devices" ,May 2003 , 361/685.*

* cited by examiner

Primary Examiner—Gregory D. Thompson
(74) Attorney, Agent, or Firm—Leong C. Lei

(57) ABSTRACT

An improved structure of a handle for a re-writing device is disclosed. The handle is characterized in that an engaging hole for the handle is provided at an appropriate position on the operation panel of the device to provide horizontal insertion of the handle and to withdraw the handle from the engaging hole, the end face of the handle, which is at a furthest distance away from the handle mount base, is exposed on the surface of the operation panel and the main body of the handle is concealed within the re-writing device and the two lateral widths of frame seat of the individual re-writing device slightly clips to the two side walls of the handle and the corners of the lateral side of the handle mount base are provided with a sliding block and a sliding slot is provided to the frame seat lateral wall corresponding to the sliding block such that the sliding block is engaged with the sliding slot and is driven by the withdrawing direction of the handle.

4 Claims, 5 Drawing Sheets

US 6,721,179 B2

STRUCTURE OF A HANDLE FOR AN EXTERNALLY-CONNECTED RE-WRITING DEVICE

BACKGROUND OF THE INVENTION

1. Field of Invention

This invention relates to a handle and in particular to a handle for a re-writing device, facilitating hand carriage or moving of the device and concealing the main body of the handle.

2. Description of the Prior Art

Re-writing device is used together with digital processing device so as to read and write data onto an optical disc. The disc is re-writable by the re-writing device and the data can be stored and kept for number of years. However, the conventional handle of such device is normally mounted at the lateral sides of the housing of the device and the CD within the re-writing cartridge is easily released in the course of impact or moving and the handle is protruded from the sides which uses up space when the device is arranged together with other devices or appliances. Accordingly, it is an object of the present invention to provide an improved structure of a handle for an externally-connected re-writing device, which overcomes the above-mentioned drawbacks.

SUMMARY OF THE INVENTION

The present invention is directed to the provision of an improved structure of a for a re-writing device, characterized in that an engaging hole for the handle is provided at an appropriate position on the operation panel of the device to provide horizontal insertion of the handle and to withdraw the handle from the engaging hole, the end face of the handle, which is at a furthest distance away from the handle mount base, is exposed on the surface of the operation panel and the main body of the handle is concealed within the re-writing device and the two lateral widths of frame seat of the individual re-writing device slightly clips to the two side walls of the handle and the corners of the lateral side of the handle mount base are provided with a sliding block and a sliding slot is provided to the frame seat lateral wall corresponding to the sliding block such that the sliding block is engaged with the sliding slot and is driven by the withdrawing direction of the handle.

It is an object of the invention to provide of an improved structure of a for a re-writing device, wherein the handle of the device is retrieved into the interior of the device and the re-writing device can be arranged together with other devices or appliances so as to reduce the space for placing these devices.

Yet a further object of the present invention is to provide an improved structure of a re-writing device, wherein the handle can be withdraw like withdrawing a drawer or to conceal the handle by pushing in the handle.

It is another object of the present invention is to provide an improved structure of of for a re-writing device, wherein the handle is provided with a plurality of heat dissipation holes which communicate with the interior of the re-writing device, and the atmosphere at the external end of the operation panel.

A further object of the present invention is to provide an improved structure of a re-writing device, wherein the top edge of the engaging hole is provide with a finger recess allowing a finger to trigger the handle.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrated example.

DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
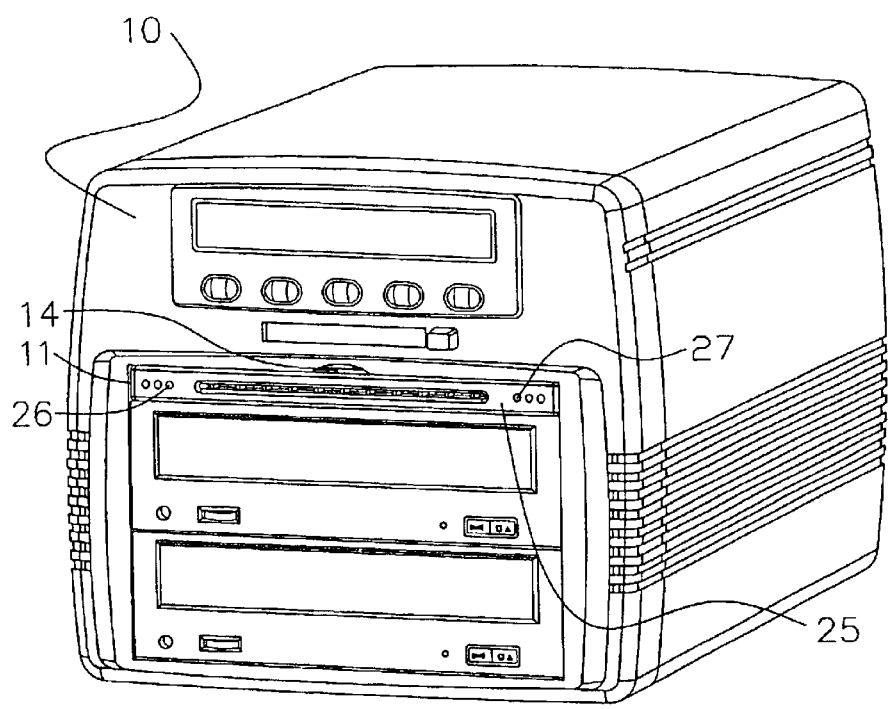
FIG. 1 is a perspective view of an improved structure of a handle for a re-writing device in accordance with the present invention.
Figure 2:
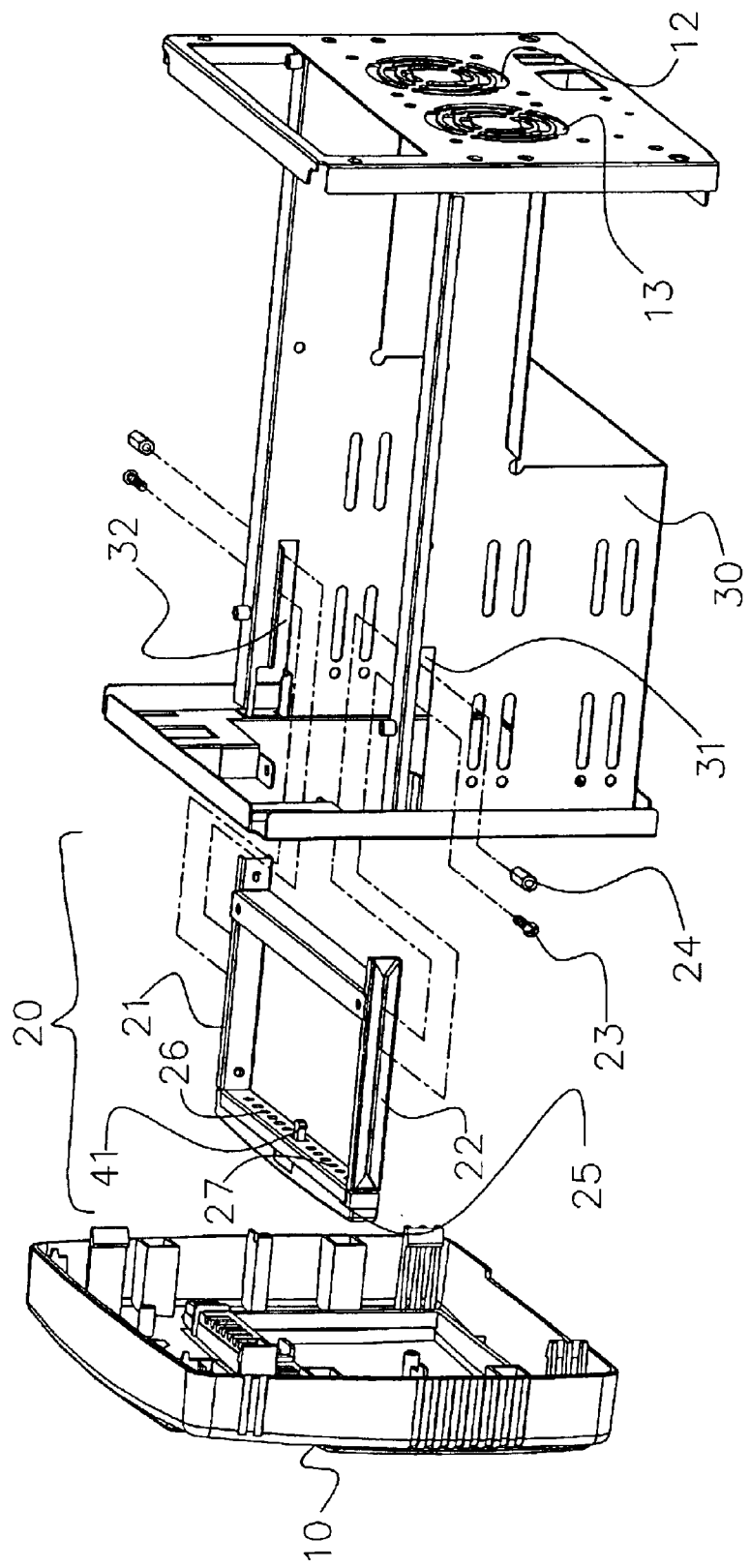
FIG. 2 is a perspective and exploded view of an improved structure of a handle for a re-writing device in accordance with the present invention.
Figure 3:
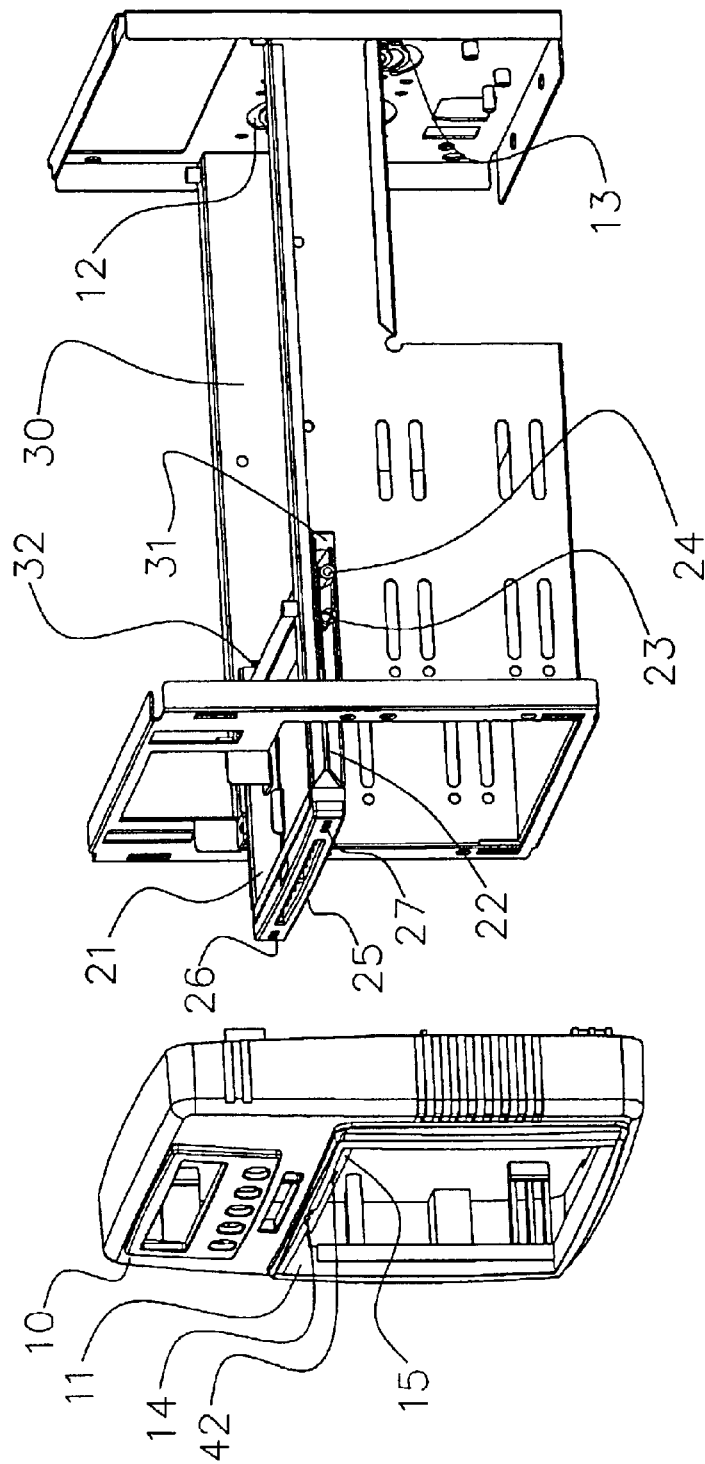
FIG. 3 is another perspective and exploded view of an improved structure of a handle for a re-writing device in accordance with the present invention.

With reference the drawings, in particular to FIG. 1, a preferred embodiment of the invention is illustrated and FIGS. 2 and 3 show perspective exploded view of an improved structure of a handle for an externally-connected re-writing device in accordance with the present invention. On the operation panel 10 of a re-writing device and at an appropriate position, an engaging slot 11 is provided so as to allow insertion of a handle 20 horizontally and the two lateral width of the frame seat 30 of the individual component of the re-writing device can slightly engage the two lateral side walls 21, 22 of the handle 20. The two external corners of the mount base of the handle 20 are provided with sliding blocks 23, 24 as shown in the figures. In accordance with the present invention, the sliding blocks 23, 24 are a screwed engaging block and are screwed to the lateral walls 21, 22 with screws. The lateral wall of the frame seat 30 which is corresponding to the sliding blocks 23, 24, is provided with sliding slots 31, 32, and the sliding blocks 23, 24 are engageable with the sliding slots 31, 32, and are subjected to the forward push of the handle 20.

The handle 25 is provided with a plurality of heat dissipation holes 26, 27 such that the holes 26, 27 are in communication with the interior of the re-writing device and the atmosphere, and in combination with the heat ventilation fan mounted at the rear end of the re-writing device and the heat dissipation holes 12, 13, a heat dissipation stream is provided such that heat dissipation of the re-writing device is effective.

Figure 4:
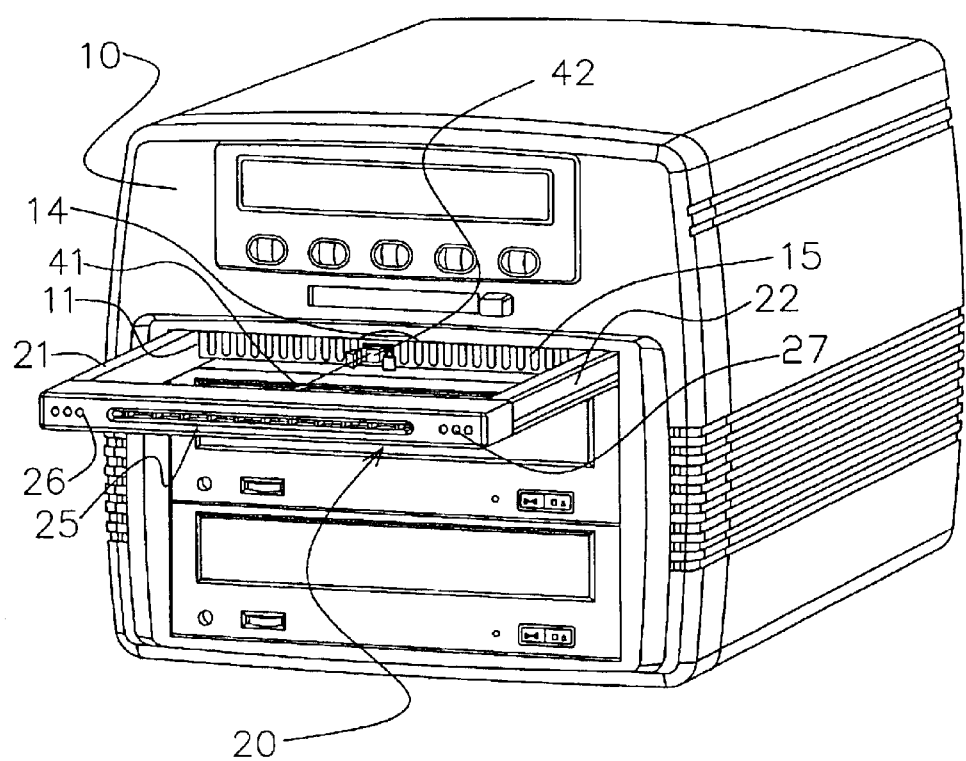
FIG. 4 is a schematic view showing the withdrawal of the handle of the improved structure of a handle for a re-writing device in accordance with the present invention.

In the present preferred embodiment, the top edge of the engaging hole 11 of the handle is provided with a recess for a finger to trigger the handle 20. As shown in FIG. 4, the inner edge of the engaging hole 11, close to the pushing section of the shaft 25, a ventilation grid 15 is provided and on the grid 15 and corresponding to the shaft 25, a male fastener 41 and a female fastener 42 are provided such that when the shaft 25 is pushed into the engaging hole 11, the male fastener 41 engaged with the female fastener 42 so that the handle 20 is secured and the handle 20 will not loose or released when the device swings. If the handle 20 is to be retrieved, the shaft 25 is slightly push and the male fastener 41 and the female fastener 42 are disengaged and the handle 20 can be hand carried.

Figure 5:
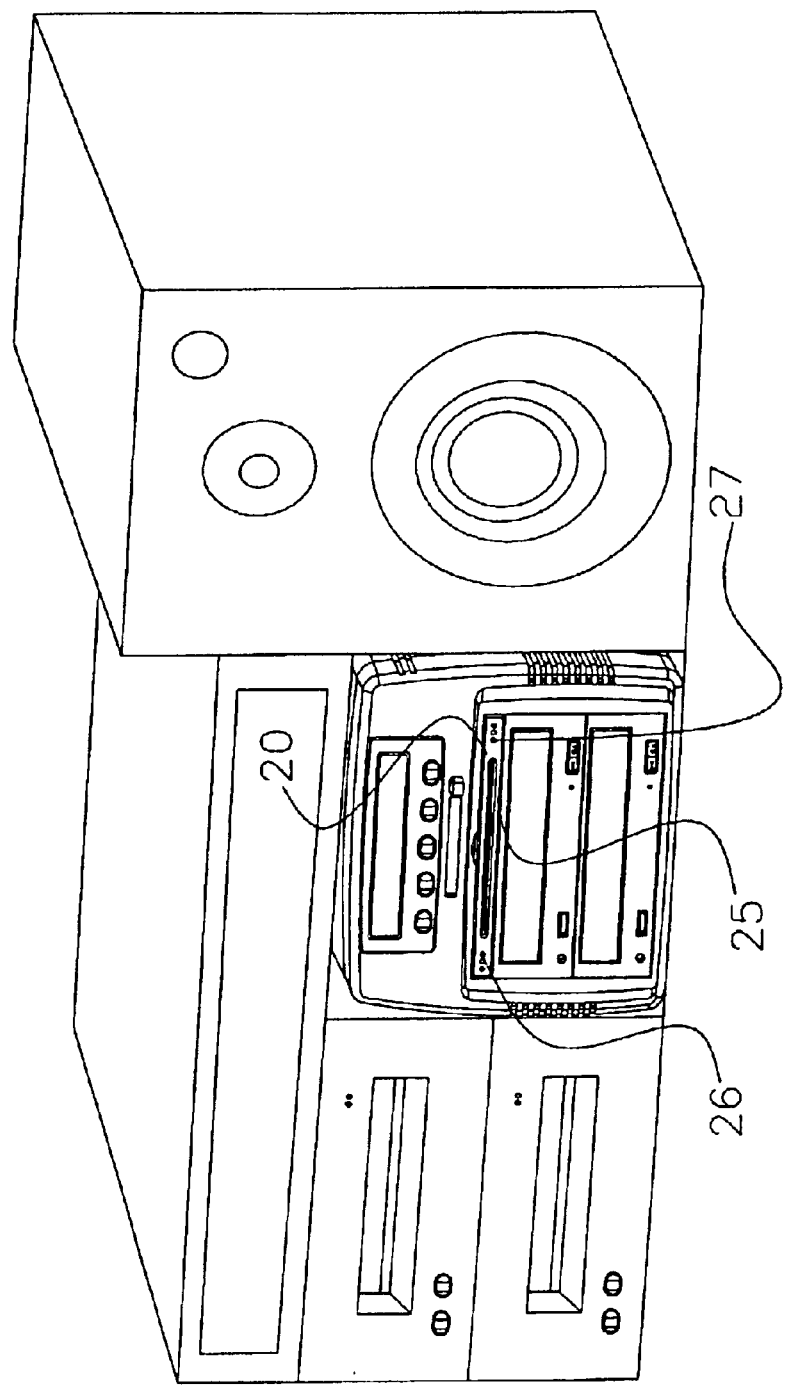
FIG. 5 a schematic view showing the arrangement of the re-writing device with the improved handle and other appliance in accordance with the present invention.

In accordance with the present invention, as shown in FIG. 5, the device with the improved handle can be arranged together with other devices or appliances and the heat dissipation holes 26, 27 on the end of the shaft 25, the front and the rear of the device provide excellent heat dissipation. Therefore, the lateral sides of the device do not need to further provide ventilation holes and other devices can be arranged either side by side or in parallel for an extended period of time. In accordance with the present invention, storage space is provided when other appliances are arranged together with the present re-writing device.

In view of the above, the present improved structure of a handle for an externally-connected re-writing device overcomes the drawbacks that found in conventional handle which mounted at the left and right lateral sides of the housing of the appliance and the CD within the cartridge of the device may be easily dislocated or dropped when impact. Further, due to the position of the handle, other devices may not be able or take a larger space to position side-by-side.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. An improved structure for a re-writing device, characterized in that an engaging hole for a handle is provided on an operation panel of the device to provide horizontal insertion of the handle and to withdraw the handle from the engaging hole, an end face of the handle, which is at a furthest distance away from a handle mount base, is exposed on a surface of the operation panel and a main body of the handle is concealed within the re-writing device and two lateral widths of frame seat of an individual re-writing device slightly clip to two side walls of the handle and corners of a lateral side of the handle mount base are provided with a sliding block and a sliding slot is provided to a lateral wall of the frame seat corresponding to the sliding block such that the sliding block is engaged with the sliding slot and is driven by a withdrawing direction of the handle.

2. The handle of claim 1, wherein the handle is provided with a plurality of heat dissipation holes which communicate with an interior of the re-writing device.

3. The handle of claim 1, wherein a top edge of the engaging hole is provided with a finger recess allowing a finger to trigger the handle.

4. The handle of claim 1, wherein an inner edge of the engaging hole, close to a pushing section of the handle, a ventilation grid is vertically mounted and on the ventilation grid corresponding to the handle, a male and female spring fastener is mounted such that pushing of the handle into the engaging hole the male fastener engages with the female fastener and the handle is fastened, and a slight pressing to the handle the male fastener is released from the female fastener and the handle is being released for carrying.

* * * * *